United States Patent
Poster et al.

(10) Patent No.: US 12,140,182 B2
(45) Date of Patent: Nov. 12, 2024

(54) LAYUP OF TAIL ROTOR DRIVE SHAFT TUBES

(71) Applicant: TEXTRON INNOVATIONS INC., Providence, RI (US)

(72) Inventors: Scott David Poster, Arlington, TX (US); Steven Kirk Spears, Hurst, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 208 days.

(21) Appl. No.: 16/694,638

(22) Filed: Nov. 25, 2019

(65) Prior Publication Data

US 2021/0156415 A1    May 27, 2021

(51) Int. Cl.
*F16C 3/02*    (2006.01)
*B29C 70/86*    (2006.01)
(Continued)

(52) U.S. Cl.
CPC .............. *F16C 3/026* (2013.01); *B29C 70/86* (2013.01); *F16C 3/02* (2013.01); *B29C 66/721* (2013.01);
(Continued)

(58) Field of Classification Search
CPC ........ F16C 3/026; F16C 3/02; F16C 2326/06; F16C 2361/65; F16C 2326/43; B29C 70/86; B29C 66/721; B29C 70/446; B29C 70/32; B29C 70/205; B29C 70/222; B32B 5/26; B32B 2260/046; B32B 2262/106; B32B 2262/101; B32B 1/00; B32B 15/14; B32B 5/08; B32B 5/028; B32B 2603/00; B32B 2260/023; B32B 2262/0261; B32B 2262/103; B32B 2262/04; B32B 2262/0269; B32B 2307/752;
(Continued)

(56) References Cited

U.S. PATENT DOCUMENTS 3,651,661 A * 3/1972 Darrow ................... F16C 3/026
464/181
7,335,108 B2    2/2008 Lin et al.
(Continued)

OTHER PUBLICATIONS

Bell Helicopter, Flight International "Bell 525 Relentless" Nov. 12, 2014.
(Continued)

*Primary Examiner* — Brian Handville
(74) *Attorney, Agent, or Firm* — Edwin S. Flores; Daniel J. Chalker; Chalker Flores, LLP (57) ABSTRACT

A composite shaft has a fiber orientation that is a combination of fibers perpendicular to each other and a longitudinal axis of the shaft; and a second composite layer disposed at an angle ranging between 25 to 45 degrees+/−3 degrees from the fibers in the first composite layer; a third composite layer disposed at an angle ranging between 7 to 13 degrees+/−3 degrees from the fibers in the second composite layer and each subsequent transition layer(s); a fourth composite layer disposed at an angle ranging between 25 to 45 degrees+/−3 degrees from the fibers in the third composite layer(s); and a fifth composite generally perpendicular +/−3 degrees to each other and the fibers in the fourth composite layer.

18 Claims, 5 Drawing Sheets

(51) Int. Cl.
    *B29C 65/00* (2006.01)
    *B29C 70/44* (2006.01)
    *B29L 23/00* (2006.01)
    *B29L 31/00* (2006.01)
    *B32B 5/26* (2006.01)

(52) U.S. Cl.
    CPC ......... *B29C 70/446* (2013.01); *B29L 2023/22* (2013.01); *B29L 2031/75* (2013.01); *B32B 5/26* (2013.01); *B32B 2260/046* (2013.01); *B32B 2262/101* (2013.01); *B32B 2262/106* (2013.01); *F16C 2326/06* (2013.01)

(58) Field of Classification Search
    CPC ............ B32B 2250/20; B32B 2250/05; B32B 2262/0253; B32B 2605/18; B32B 2262/14; B32B 2307/306; B32B 15/02; B32B 5/12; B29L 2023/22; B29L 2031/75; B64D 35/04; B64C 27/14; B64C 27/06; B64C 2027/8281
    See application file for complete search history.

(56) References Cited

U.S. PATENT DOCUMENTS

| | | | |
|---|---|---|---|
| 9,359,073 B2 | 6/2016 | Hewitt | |
| 2012/0027609 A1* | 2/2012 | Ogde | B29C 70/545 |
| | | | 416/226 |
| 2015/0060594 A1* | 3/2015 | Nguyen | B64C 27/14 |
| | | | 244/17.11 |
| 2017/0268120 A1* | 9/2017 | Rice | B32B 15/00 |
| 2018/0087670 A1* | 3/2018 | Poster | F16J 15/3224 |
| 2019/0001607 A1* | 1/2019 | Boese | B32B 5/04 |

OTHER PUBLICATIONS

Perry, Dominic "Analysis: Bell 525 Relentless cutaway and technical Description" https://www.flightglobal.com/news/articles/analysis-bell-525-relentless-cutaway-and-technical-4055411, Source: Bell Helicopter, Flight International, London, Nov. 12, 2014, 8 pp.

* cited by examiner

LAYUP OF TAIL ROTOR DRIVE SHAFT TUBES

CROSS-REFERENCE TO RELATED APPLICATIONS

This patent application is related to U.S. provisional patent application Ser. No. 62/399,067 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which is hereby incorporated by reference in its entirety.

STATEMENT OF FEDERALLY FUNDED RESEARCH

Not applicable.

TECHNICAL FIELD OF THE INVENTION

The present invention relates in general to the field of tail rotors, and more particularly, to a layup of a tail rotor drive shaft tube for use in an aircraft, for example, a rotorcraft.

BACKGROUND OF THE INVENTION

Without limiting the scope of the invention, its background is described in connection with tail rotor drive systems.

Since their inception, rotorcraft and rotorcraft drive systems have been improved to reduce the possibility of failure during flight and†or to improve aircraft capability. Toward that end, a number of modifications have been made to drive systems to advance the state of the art. However, despite advances in materials and design, a number of challenges continue to exist that affect rotorcraft performance†capability. One example of a problem with current rotorcraft drive systems is that, in some instances, the failure of single drive system component leads to failure of the entire drive system.

More particularly, the failure of a single gearbox or shaft connecting the various gearboxes can significantly impact operations.

Thus, a need remains for improving the overall safety and reliability of rotorcraft drive systems that include the connections between the main rotor gearbox, tail rotor gearbox, reduction and accessory gearboxes, shafts, generators, oil pumps, and accessories connected to the drive system. Specifically, systems and methods that minimize maintenance required and maintenance related incidents are desirable.

SUMMARY OF THE INVENTION

In one embodiment, the present invention includes a composite shaft including: a first composite layer having a first fiber orientation including a combination of fibers that are generally perpendicular (+/−3 degrees) to each other and a longitudinal axis of the composite shaft; a second composite layer surrounding the first composite layer and having generally parallel fibers disposed at a first angle ranging between +/−25 to +/−45 degrees (+/−3 degrees) from the fibers in the first composite layer; a third composite layer surrounding the second composite layer, wherein the third composite layer includes one or more transition layers having generally parallel fibers disposed at a second angle ranging between +/−7 to +/−13 degrees (+/−3 degrees) from the fibers in the second composite layer and each subsequent transition layer(s); a fourth composite layer surrounding the third composite layer(s) having generally parallel fibers disposed at a third angle ranging between +/−25 to +/−45 degrees (+/−3 degrees) from the fibers in the third composite layer(s); and a fifth composite layer surrounding the fourth composite layer and having a second fiber orientation that is a combination of fibers that are generally perpendicular (+/−3 degrees) to each other and to the fibers in the fourth composite layer. In one aspect, each of the first, second, third, fourth, and fifth composite layers include at least one of carbon, cellulose, aramid, nylon, polyethylene, or glass fibers. In another aspect, each of the first, second, third, fourth, and fifth composite layers include at least one of epoxy resin, cyanate resin, phenolic resin, polyimide resin, bismaleimide resin, vinyl ester resin, unsaturated polyester resin, polyether ether ketone, or nylon. In another aspect, each of the first, second, third, fourth, and fifth composite layers include one or more pre-preg sheets. In another aspect, the composite shaft is adapted for use in a rotorcraft. In another aspect, the composite shaft is formed into a tail rotor composite shaft, a drive shaft, a stiffener, a rod, a tube, or a transition shaft. In another aspect, the composite shaft further includes a first bearing assembly connected to a first end of the composite shaft; and a second bearing assembly connected to a second end of the composite shaft. In another aspect, the composite shaft further includes one or more first composite shafts connecting a main rotor gearbox to an intermediate gearbox; and one or more second composite shafts connecting the intermediate gearbox to a tail rotor gearbox. In another aspect, the composite shaft further includes fibers or wires that include metals, carbon fiber, metal-carbon fiber, aramid fiber, fiber reinforcement unidirectional layers embedded in a thermoplastic polymer, or combinations thereof. In another aspect, the composite shaft is resistant to temperatures of approximately 400 degrees F. In another aspect, each of the one or more transition layers are disposed at an angle ranging between +/−10 degrees+/−3 degrees. In another aspect, reinforcement fibers in the composite shaft include about 55 to 70 percent by volume. In another aspect, the composite shaft further includes at least one of (1) an inner layer or core comprising fiberglass and disposed inside the first composite layer and (2) an outer layer comprising fiberglass and disposed outside the fifth composite layer.

In another embodiment, the present invention includes a method of making a composite shaft including: providing a first composite layer having a fiber orientation that is a combination of fibers that are generally perpendicular to each other and a longitudinal axis of the composite shaft; surrounding the first composite layer with a second composite layer and having generally parallel fibers, wherein the parallel fibers are disposed at an angle ranging between +/−25 to +/−45 degrees+/−3 degrees from the fibers in the first composite layer; surrounding the second composite layer with a third composite layer, where the third composite layer including one or more transition layers having generally parallel fibers, wherein the parallel fibers are disposed at an angle ranging between +/−7 to +/−13 degrees+/−3 degrees from the fibers in the second composite layer and each subsequent transition layer(s); surrounding the third composite layer(s) with a fourth composite layer having generally parallel fibers, wherein the parallel fibers of each of the one or more transition layers are disposed at an angle ranging between +/−25 to +/−45 degrees+/−3 degrees from the fibers in the third composite layer(s); surrounding the fourth composite layer with a fifth composite layer and having a fiber orientation that is a combination of fibers that are generally perpendicular +/−3 degrees to each other and the fibers in the fourth composite layer; and curing each of the first to fifth composite layers of the composite shaft. In one aspect, each of the first, second, third, fourth, and fifth composite layers include at least one of carbon, cellulose, aramid, nylon, polyethylene, or glass fibers. In another aspect, each of the first, second, third, fourth, and fifth composite layers include at least one of epoxy resin, cyanate resin, phenolic resin, polyimide resin, bismaleimide resin, vinyl ester resin, unsaturated polyester resin, polyether ether ketone, or nylon. In another aspect, each of the first, second, third, fourth, and fifth composite layers include one or more pre-preg sheets. In another aspect, the method further includes adapting the composite shaft is for use in a rotor-craft. In another aspect, the method further includes forming the composite shaft into a tail rotor composite shaft, a drive shaft, a stiffener, a rod, a tube, or a transition shaft. In another aspect, the method further includes connecting a first bearing assembly to a first end of the composite shaft; and connecting a second bearing assembly to a second end of the composite shaft. In another aspect, the composite shaft includes one or more first composite shafts and one or more second composite shafts, and the method further includes forming a tail rotor shaft assembly by connecting the one or more first composite shafts between a main rotor gearbox and an intermediate gearbox, and connecting the one or more second composite shafts between the intermediate gearbox and a tail rotor gearbox. In another aspect, the composite shaft further includes fibers or wires that include metals, carbon fiber, metal-carbon fiber, aramid fiber, fiber reinforcement unidirectional layers embedded in a thermoplastic polymer, or combinations thereof. In another aspect, the composite shaft is resistant to temperatures of approximately 400 degrees F. In another aspect, reinforcement fibers in the composite shaft include about 55 to 70 percent by volume. In another aspect, the step of curing the composite shaft is a co-curing step of one or more of the first to fifth composite layers. In another aspect, the step of curing is under vacuum and heated. In another aspect, the method further includes disposing at least one of (1) an inner layer or core comprising fiberglass inside the first composite layer and (2) an outer layer includes fiberglass outside the fifth composite layer.

In another embodiment, the present invention includes a method of using a composite drive shaft in a helicopter, including: providing a drive shaft including one or more composite drive shafts, each of the composite drive shafts connected to one or more bearing assemblies, the drive shaft having a proximal end and a distal end; connecting the proximal end of the drive shaft to a first gearbox; and connecting the distal end of the drive shaft to a second gearbox. In another aspect, the first gearbox includes a main rotor gearbox and the second gearbox includes an intermediate gearbox. In another aspect, the first gearbox includes an intermediate gearbox and the second gearbox includes a tail rotor gearbox In another embodiment, the present invention includes a helicopter, including: a fuselage; a main rotor gearbox coupled to the fuselage; one or more engines coupled to the main rotor gearbox; a main rotor system coupled to the main rotor gearbox; a first drive shaft having a proximal end connected to the main rotor gearbox, the first drive shaft including one or more composite shafts, each of the composite shafts connected to one or more bearing assemblies, wherein each composite shaft includes: a first composite layer having a fiber orientation that is a combination of fibers that are generally perpendicular to each other and a longitudinal axis of the shaft; a second composite layer surrounding the first composite layer and having generally parallel fibers, wherein the parallel fibers are disposed at an angle ranging between 25 to 45 degrees+/−3 degrees from the fibers in the first composite layer; a third composite layer surrounding the second composite layer, where the third composite layer including one or more transition layers having generally parallel fibers, wherein the parallel fibers are disposed at an angle ranging between 7 to 13 degrees+/−3 degrees from the fibers in the second composite layer and each subsequent transition layer(s); a fourth composite layer surrounding the third composite layer(s) having generally parallel fibers, wherein the parallel fibers of each of the one or more transition layers are disposed at an angle ranging between 25 to 45 degrees+/−3 degrees from the fibers in the third composite layer(s); and a fifth composite layer surrounding the fourth composite layer and having a fiber orientation that is a combination of fibers that are generally perpendicular +/−3 degrees to each other and the fibers in the fourth composite layer; and an intermediate gearbox connected to a distal end of the first drive shaft. In another aspect, the helicopter includes a second drive shaft having a proximal end connected to the intermediate gearbox, and comprising one or more of the composite shafts; a tail rotor gearbox connected to a distal end of the second drive shaft; and a tail rotor coupled to the tail rotor gearbox

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
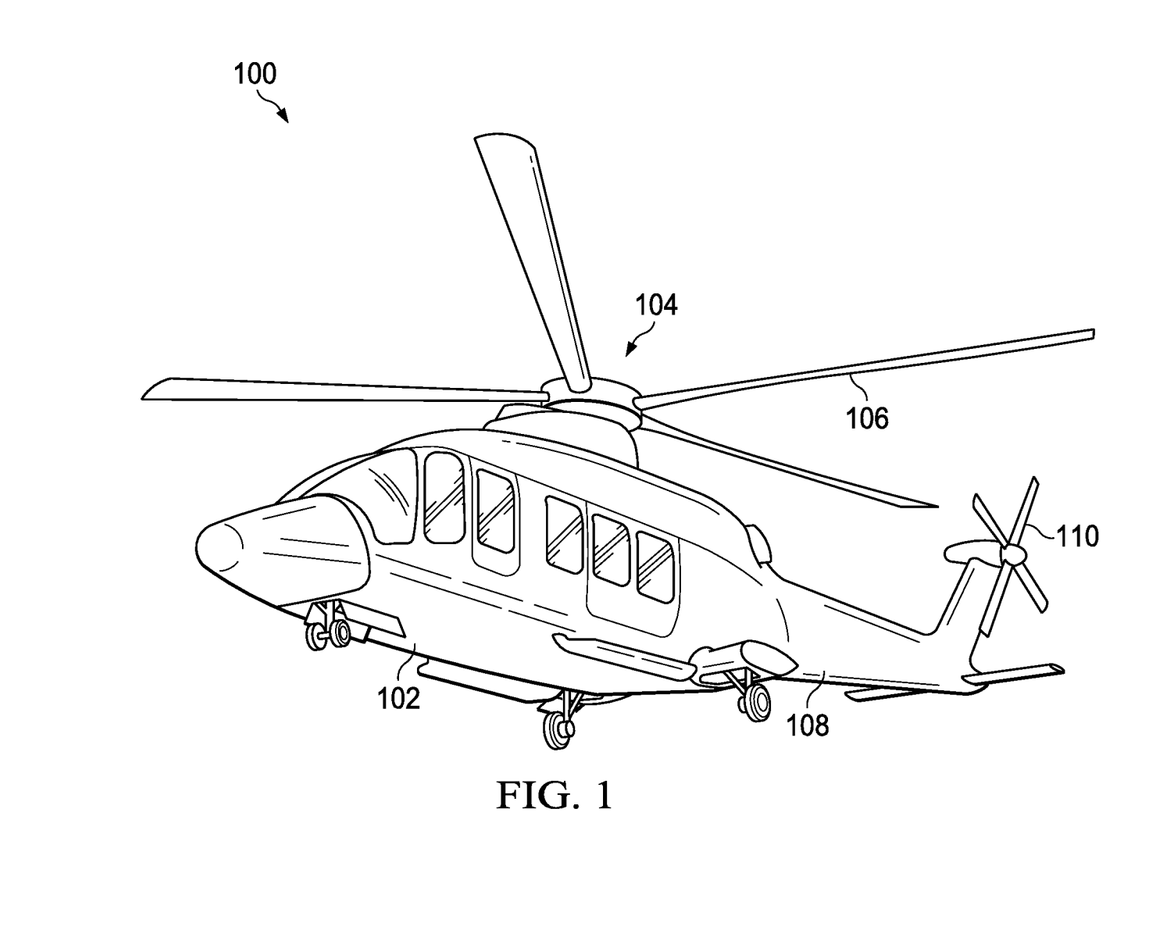
FIG. 1 shows a side view of a helicopter according to a preferred embodiment of the present application.

FIG. 1 shows an aircraft 100 in accordance with a preferred embodiment of the present application. In the exemplary embodiment, aircraft 100 is a helicopter having a fuselage 102 and a main rotor system 104 carried thereon. A plurality of main rotor blades 106 are operably associated with the main rotor system 104 for creating flight. A tail boom 108 is depicted that further includes tail rotor 110.

Figure 2:
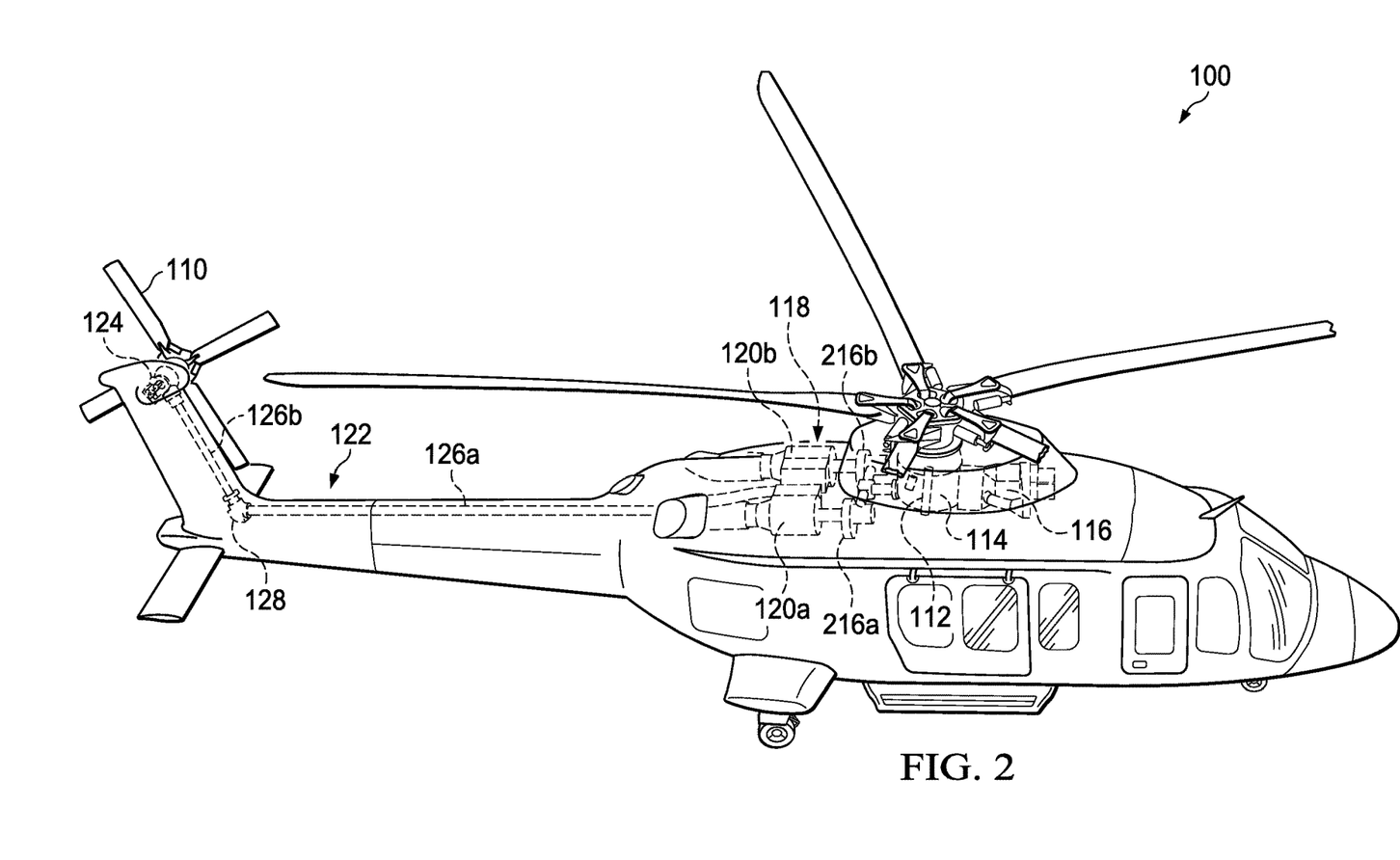
FIG. 2 shows a perspective view of helicopter aircraft according to an alternative embodiment of the present application.

For example, FIG. 2 shows a perspective view of aircraft 100 that includes additional detail of the present invention. Aircraft 100 further includes a main rotor mast 112, which is connected to the main rotor gearbox 114. The main rotor gearbox 114 is connected to one or more accessory gear boxes 116 and one or more engine reduction gearboxes 216a, 216b. Each engine reduction gearbox 216a, 216b is connected to one or more engines 120a, 120b, which are within an engine compartment 118. A tail rotor drive shaft assembly 122 transmits mechanical rotation from the main rotor gearbox 114 to the tail rotor 110. More specifically, a first drive shaft 126a has a proximal end connected to the main rotor gearbox 114 and a distal end connected to an intermediate gearbox 128, and a second drive shaft 126b has a proximal end connected to the intermediate gearbox 128 and a distal end connected to the tail rotor gearbox 124. The tail rotor gearbox 124 is connected to the tail rotor 110.

Figure 3:
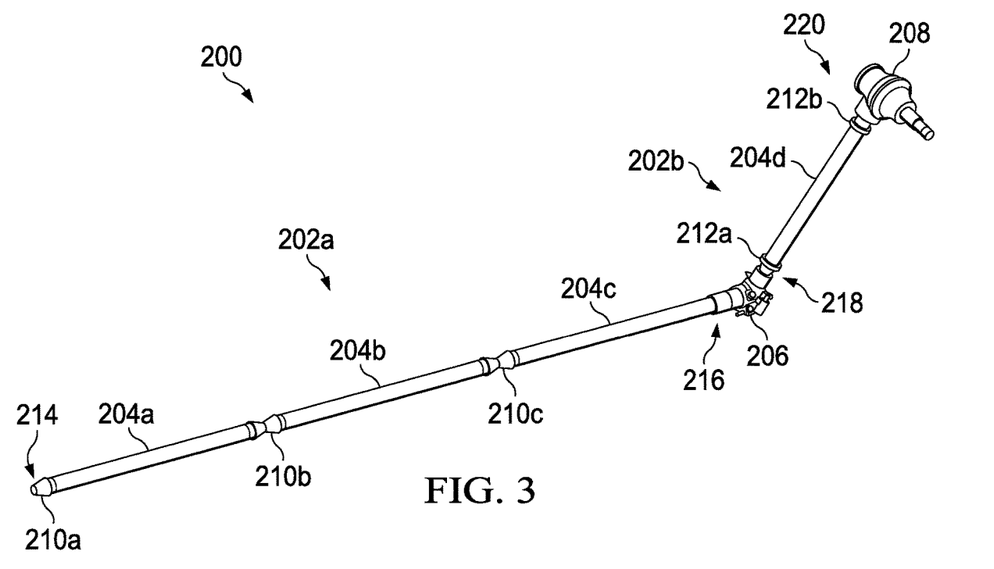
FIG. 3 shows an isometric view of a drive system that depicts the present invention.

FIG. 3 shows a tail rotor drive system 200 that includes a first drive shaft 202a having multiple composite shafts 204a, 204b, 204c, and a second drive shaft 202b having one or more composite shafts 204d. In this version, the composite shafts 204a, 204b, 204c, also referred to as first composite shafts, are connected by bearing assemblies 210a, 210b, 210c (e.g., hanger bearing assemblies) within the tail boom 108 and under the engine(s) 120a, 120b. The composite shaft 204d, also referred to as second composite shafts, are connected by bearing assemblies 212a, 212b. The proximal end 214 of the first drive shaft 202a is connected to the main rotor gearbox and the distal end 216 of first drive shaft 202a is connected to the intermediate gearbox 206. The proximal end 218 of the second drive shaft 202b is connected to the intermediate gearbox 206 and the distal end 220 of the second drive shaft 202b is connected to the tail rotor gearbox 206. Note that more or less of the composite shafts 204a-204d can be used.

Figure 4:
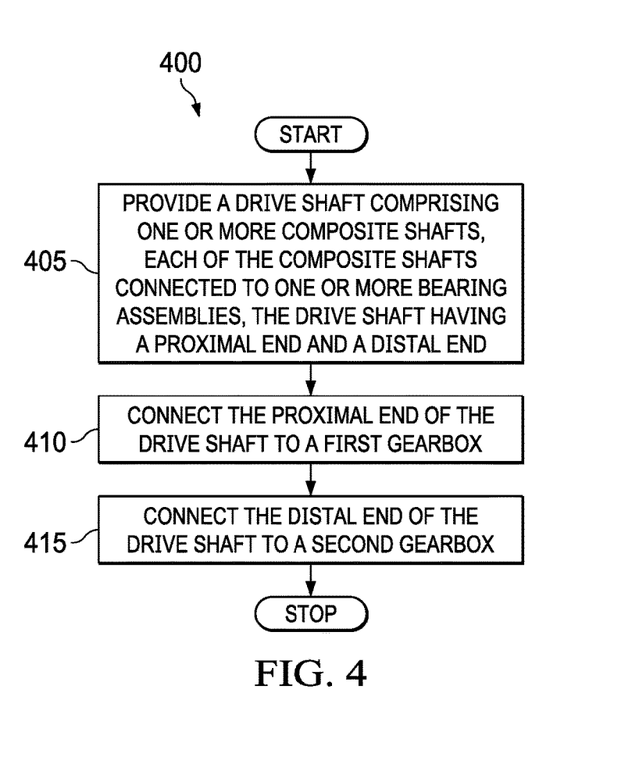
FIG. 4 shows a flowchart for a method of using a composite drive shaft in a helicopter.
Figure 5:
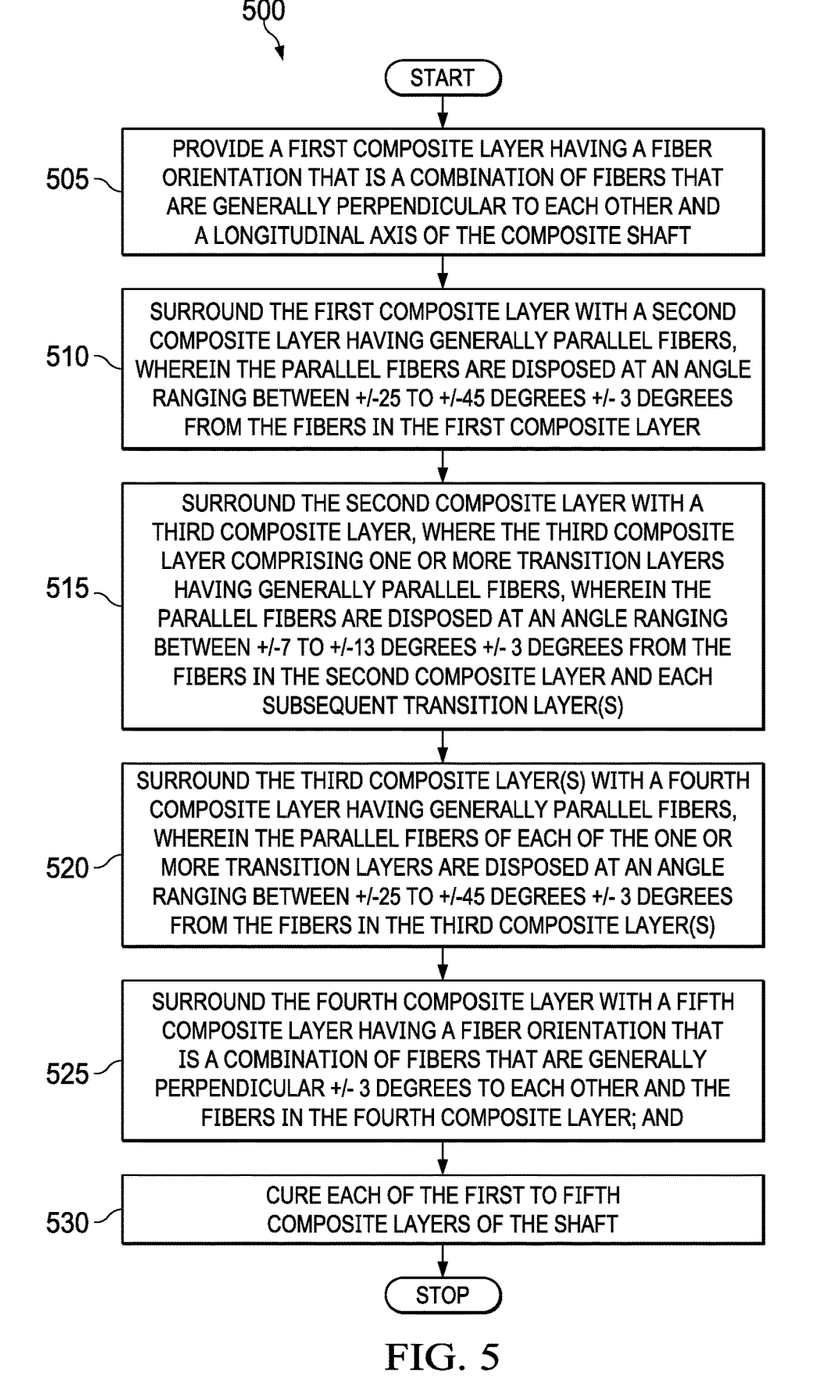
FIG. 5 shows a flowchart for a method of making a composite shaft.
Figure 6A:
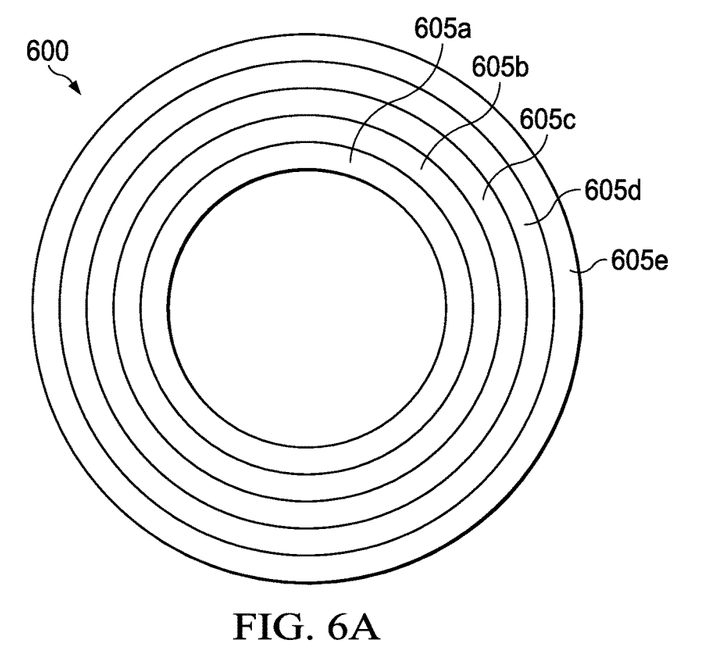
FIG. 6A shows a cross-section of a composite drive shaft with five composite layers.
Figure 6B:
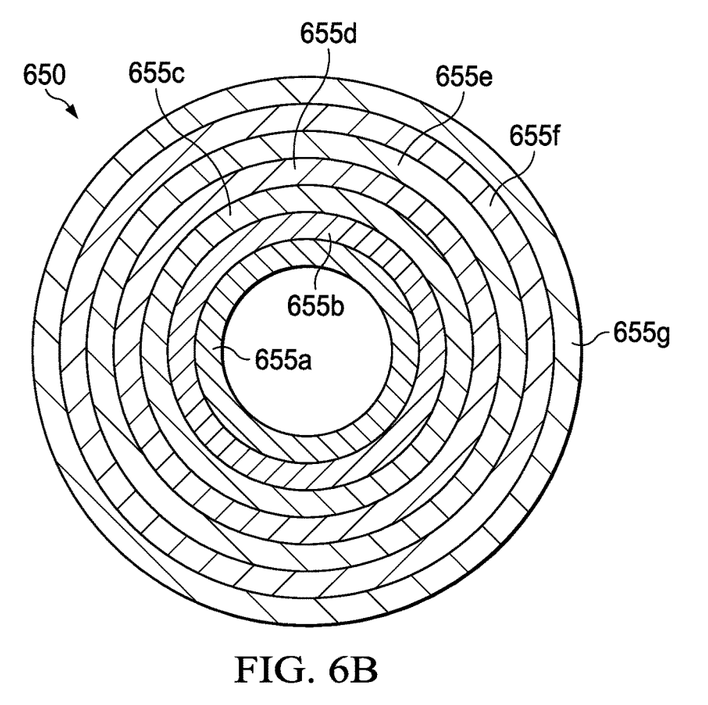
FIG. 6B shows a cross-section of a composite drive shaft with seven composite layers.

FIG. 4 shows a flowchart for a method 400 of using a composite drive shaft in a helicopter such as aircraft 100. A drive shaft including one or more composite shafts is provided in block 405. Each of the composite shafts are connected to one or more bearing assemblies, and the drive shaft has a proximal end and a distal end. The proximal end of the drive shaft is connected to a first gearbox in block 410. The distal end of the drive shaft 202 is connected to a second gearbox in block 415. In one embodiment, the first gearbox is a main rotor gearbox and the second gearbox is an intermediate gearbox. In another embodiment, the first gearbox is an intermediate gearbox and the second gearbox includes a tail rotor gearbox. Various embodiments of the composite shafts 204a-204d are described below in reference to FIGS. 5, 6A and 6B FIG. 5 shows a flowchart for a method 500 of making a composite shaft. A first composite layer having a fiber orientation that is a combination of fibers that are generally perpendicular to each other and a longitudinal axis of the composite shaft is provided in block 505. The first composite layer is surrounded with a second composite layer having generally parallel fibers in block 510, wherein the parallel fibers are disposed at an angle ranging between +/−25 to +/−45 degrees+/−3 degrees from the fibers in the first composite layer. The second composite layer is surrounded with a third composite layer in block 515, where the third composite later includes one or more transition layers having generally parallel fibers, wherein the parallel fibers are disposed at an angle ranging between +/−7 to +/−13 degrees+/−3 degrees from the fibers in the second composite layer and each subsequent transition layer(s). The third composite layer(s) is surrounded with a fourth composite layer having generally parallel fibers in block 520, wherein the parallel fibers of each of the one or more transition layers is disposed at an angle ranging between +/−25 to +/−45 degrees+/−3 degrees from the fibers in the third composite layer(s). The fourth composite layer is surrounded with a fifth composite layer having a fiber orientation that is a combination of fibers that are generally perpendicular +/−3 degrees to each other and the fibers in the fourth composite layer in block 525. Each of the first to fifth composite layers of the composite shaft are cured in block 530.

The composite shaft may be manufactured using any suitable manufacturing method or composite assembly and curing technique, e.g., Vacuum Assisted Resin Transfer Molding (VARTM), hand lay-up, injection molding, Resin Transfer Molding (RTM), spray lay-up, filament winding, etc. A wide variety of reinforcing fibers and resins may be used with the present invention. Non-limiting examples of reinforcing fibers or wires include, e.g., carbon, cellulose, aramid, or glass fibers or wires. In addition, other materials may also be used, e.g., metal fibers or wires, carbon fibers, metal-carbon fibers, aramid fibers, nylon fibers, or other fiber reinforcement. Non-limiting examples of resins or materials for use with the present invention includes, e.g., epoxy resin, cyanate resin, phenolic resin, polyimides, vinyl ester resin, unsaturated polyester resin, polyether ether ketone, or nylon. The resins may be heat-cured, extrudable, vacuum cured, or any combination thereof. The reinforcing fibers and the curable material may be preformed, e.g., a pre-impregnated (pre-preg) mat or mesh infused with the curable material.

In addition, other materials may be used, e.g., adhesion promoters that form plastics such as ethylene-vinyl acetate (EVA), polychlorinated biphenyls (PCB), amorphous poly-alpha-olefins (APAO), urethane-based thermoplastic elastomers (TPE-U), thermoplastic copolyesters (TPE-E), thermoplastic copolyamides (TPE-A), ethylene-vinyl alcohol (EVOH), and polyethylene (PE), or combinations thereof. Non-limiting examples of thermoplastic materials include, e.g., polymethyl methacrylate (PMMA), polycarbonate (PC), styrene-acrylonitrile (SAN), polyvinyl fluoride (PVF), and polyvinyl chloride (PVC), polyethylene (PE), polyacetate (PA), or combinations thereof.

A drive shaft of the present invention may include at least one of (1) an inner layer or core comprising fiberglass and disposed inside the first composite layer and (2) an outer layer comprising fiberglass and disposed outside the fifth composite layer, to provide damage tolerance and to prevent galvanic corrosion.

In addition, the method 500 may also include forming the composite shaft into a tail rotor composite shaft, a drive shaft, a stiffener, a rod, a tube, or a transition shaft. In another aspect, the method further includes connecting a first bearing assembly to a first end of the composite shaft; and connecting a second bearing assembly to a second end of the composite shaft. In another aspect, the composite shaft includes one or more first composite shafts and one or more second composite shafts, and the method further includes forming a tail rotor shaft assembly by connecting the one or more first composite shafts between a main rotor gearbox and an intermediate gearbox, and connecting the one or more second composite shafts between the intermediate gearbox and a tail rotor gearbox. In another aspect, the composite shaft further includes fibers or wires that include metals, carbon fiber, metal-carbon fiber, aramid fiber, fiber reinforcement unidirectional layers embedded in a thermoplastic polymer, or combinations thereof. In another aspect, the composite shaft is resistant to temperatures of approximately 400 degrees F. In another aspect, reinforcement fibers in the composite shaft include about 55 to 70 percent by volume. In another aspect, the step of curing the composite shaft is a co-curing step of one or more of the first to fifth composite layers. In another aspect, the step of curing is under vacuum and heated. In another aspect, the method further includes disposing at least one of (1) an inner layer or core comprising fiberglass inside the first composite layer and (2) an outer layer comprising fiberglass outside the fifth composite layer.

FIG. 6A shows a cross-section of a composite shaft 600 with five composite layers 605a, 605b, 605c, 605d, and 605e. More specifically, the composite shaft 600 includes: a first composite layer 605a having a first fiber orientation including a combination of fibers that are generally perpendicular (+/−3 degrees) to each other and a longitudinal axis of the composite shaft 600; a second composite layer 605b surrounding the first composite layer 605a and having generally parallel fibers disposed at a first angle ranging between +/−25 to +/−45 degrees (+/−3 degrees) from the fibers in the first composite layer 605a; a third composite layer 605c surrounding the second composite layer 605b, wherein the third composite layer 605c includes one or more transition layers having generally parallel fibers disposed at a second angle ranging between +/−7 to +/−13 degrees (+/−3 degrees) from the fibers in the second composite layer 605b and each subsequent transition layer(s); a fourth composite layer 605d surrounding the third composite layer(s) 605c having generally parallel fibers disposed at a third angle ranging between +/−25 to +/−45 degrees (+/−3 degrees) from the fibers in the third composite layer(s) 605c; and a fifth composite layer 605e surrounding the fourth composite layer 605d and having a second fiber orientation that is a combination of fibers that are generally perpendicular (+/−3 degrees) to each other and to the fibers in the fourth composite layer 605d.

In one aspect, each of the first, second, third, fourth, and fifth composite layers include at least one of carbon, cellulose, aramid, nylon, polyethylene, or glass fibers. In another aspect, each of the first, second, third, fourth, and fifth composite layers include at least one of epoxy resin, cyanate resin, phenolic resin, polyimide resin, bismaleimide resin, vinyl ester resin, unsaturated polyester resin, polyether ether ketone, or nylon. In another aspect, each of the first, second, third, fourth, and fifth composite layers include one or more pre-preg sheets. In another aspect, the composite shaft is adapted for use in a rotorcraft. In another aspect, the composite shaft is formed into a tail rotor composite shaft, a drive shaft, a stiffener, a rod, a tube, or a transition shaft. In another aspect, the composite shaft further includes a first bearing assembly connected to a first end of the composite shaft; and a second bearing assembly connected to a second end of the composite shaft. In another aspect, the composite shaft further includes one or more first composite shafts connecting a main rotor gearbox to an intermediate gearbox; and one or more second composite shafts connecting the intermediate gearbox to a tail rotor gearbox. In another aspect, the composite shaft further includes fibers or wires that include metals, carbon fiber, metal-carbon fiber, aramid fiber, fiber reinforcement unidirectional layers embedded in a thermoplastic polymer, or combinations thereof. In another aspect, the composite shaft is resistant to temperatures of approximately 400 degrees F. In another aspect, each of the one or more transition layers are disposed at an angle ranging between +/−10 degrees+/−3 degrees. In another aspect, reinforcement fibers in the composite shaft include about 55 to 70 percent by volume. In another aspect, the composite shaft further includes at least one of (1) an inner layer or core comprising fiberglass and disposed inside the first composite layer and (2) an outer layer comprising fiberglass and disposed outside the fifth composite layer.

One example of a lay-up for a shaft, rod or tube includes the layers set forth in Table 1.

TABLE 1

Example A

| Lay-up sequence level | Fiber angle (+/−3°) | Material |
|---|---|---|
| 1 (inner) | 0°/90° | EGL/Epoxy Fabric |
| 2 | +/−25 to 45° | Carbon/Epoxy |
| Transition layer(s) | +/−7 to 13° | Carbon/Epoxy |
| 4 | +/−25 to 45° | Carbon/Epoxy |
| 5 (outer) | 0°/90° | EGL/Epoxy Fabric |

FIG. 6B shows a cross-section of a composite shaft 650 with seven composite layers 655a, 655b, 655c, 655d, 655e, 655f, 655g, and 655h. More specifically, the composite shaft 650 includes: a first composite layer 655a having a first fiber orientation including a combination of fibers that are generally perpendicular (+/−3 degrees) to each other and a longitudinal axis of the composite shaft 650; a second composite layer 655b surrounding the first composite layer 655a and having generally parallel fibers disposed at a first angle ranging between +/−25 to +/−45 degrees (+/−3 degrees) from the fibers in the first composite layer 655a; a third composite layer 655c surrounding the second composite layer 655b, wherein the third composite layer 655c includes one or more transition layers having generally parallel fibers disposed at a second angle ranging between +/−7 to +/−13 degrees (+/−3 degrees) from the fibers in the second composite layer 655b and each subsequent transition layer(s); a fourth composite layer 655d surrounding the third composite layer 655c, wherein the fourth composite layer 655d includes generally parallel fibers disposed at a second angle ranging between +/−7 to +/−13 degrees (+/−3 degrees) from the fibers in the third composite layer 655c; a fifth composite layer 655e surrounding the fourth composite layer 655d, wherein the fifth composite layer 655e includes generally parallel fibers disposed at a second angle ranging between +/−7 to +/−13 degrees (+/−3 degrees) from the fibers in the fourth composite layer 655d; a sixth composite layer 655f surrounding the fifth composite layer(s) 655e having generally parallel fibers disposed at a third angle ranging between +/−25 to +/−45 degrees (+/−3 degrees) from the fibers in the fifth composite layer 655e; and a seventh composite layer 655g surrounding the sixth composite layer 655f and having a second fiber orientation that is a combination of fibers that are generally perpendicular (+/−3 degrees) to each other and to the fibers in the sixth composite layer 655f.

In one aspect, each of the first, second, third, fourth, fifth, sixth and seventh composite layers include at least one of carbon, cellulose, aramid, nylon, polyethylene, or glass fibers. In another aspect, each of the first, second, third, fourth, fifth, sixth and seventh composite layers include at least one of epoxy resin, cyanate resin, phenolic resin, polyimide resin, bismaleimide resin, vinyl ester resin, unsaturated polyester resin, polyether ether ketone, or nylon. In another aspect, each of the first, second, third, fourth, fifth, sixth and seventh composite layers include one or more pre-preg sheets. In another aspect, the composite shaft is adapted for use in a rotorcraft. In another aspect, the composite shaft is formed into a tail rotor composite shaft, a drive shaft, a stiffener, a rod, a tube, or a transition shaft. In another aspect, the composite shaft further includes a first bearing assembly connected to a first end of the composite shaft; and a second bearing assembly connected to a second end of the composite shaft. In another aspect, the composite shaft further includes one or more first composite shafts connecting a main rotor gearbox to an intermediate gearbox; and one or more second composite shafts connecting the intermediate gearbox to a tail rotor gearbox. In another aspect, the composite shaft further includes fibers or wires that include metals, carbon fiber, metal-carbon fiber, aramid fiber, fiber reinforcement unidirectional layers embedded in a thermoplastic polymer, or combinations thereof. In another aspect, the composite shaft is resistant to temperatures of approximately 400 degrees F. In another aspect, each of the one or more transition layers are disposed at an angle ranging between +/−10 degrees+/−3 degrees. In another aspect, reinforcement fibers in the composite shaft include about 55 to 70 percent by volume. In another aspect, the composite shaft further includes at least one of (1) an inner layer or core comprising fiberglass and disposed inside the first composite layer and (2) an outer layer comprising fiberglass and disposed outside the fifth composite layer.

Another example of a lay-up for a shaft, rod or tube includes the layers set forth in Table 2, with the transition layers designated in bold.

TABLE 2

Example B

| Lay-up sequence level | Fiber angle (+/−3°) | Material |
| --- | --- | --- |
| 1 (inner) | 0°/90° | EGL/Epoxy Fabric |
| 2 | +/−25 to 45° | Carbon/Epoxy |
| 3 | +/−7 to 10° | Carbon/Epoxy |
| 4 | +/−7 to 10° | Carbon/Epoxy |
| 5 | +/−7 to 10° | Carbon/Epoxy |
| 6 | +/−25 to 45° | Carbon/Epoxy |
| 7 (outer) | 0°/90° | EGL/Epoxy Fabric |

Yet another example of a lay-up for a shaft, rod or tube includes the layers set forth in Table 3.

TABLE 3

Example C

| Lay-up sequence level | Fiber angle (+/−3°) | Material |
| --- | --- | --- |
| 1 (inner) | 0°/90° | EGL/Epoxy Fabric |
| 2 | +/−35° | Carbon/Epoxy |
| Transition layer(s) | +/−10° | Carbon/Epoxy |
| 4 | +/−35° | Carbon/Epoxy |
| 5 (outer) | 0°/90° | EGL/Epoxy Fabric |

The variance in the fiber angle of +/−3° can be +3.0°, +2.9°, +2.8°, +2.7°, +2.6°, +2.5°, +2.4°, +2.3°, +2.2°, +2.1°, +2.0°, +1.9°, +1.8°, +1.7°, +1.6°, +1.5°, +1.4°, +1.3°, +1.2°, +1.1°, +1.0°, +0.9°, +0.8°, +0.7°, +0.6°, +0.5°, +0.4°, +0.1° 0°, −0.1°, −0.2°, −0.3°, −0.4°, −0.5°, −0.6°, −0.7°, −0.8°, −0.9°, −1.0°, −1.1°, −1.2°, −1.3°, −1.4°, −1.5°, −1.6°, −1.7°, −1.8°, −1.9°, −2.0°, −2.1°, −2.2°, −2.3°, −2.4°, −2.5°, −2.6°, −2.7°, −2.8°, −2.9° or −3.0° of the stated fiber angle or other incremental percentage between. The fiber angle range of +/−25 to 45 can be +/−25°, +/−25.5°, +/−26°, +/−26.5°, +/−27°, +/−27.5°, +/−28°, +/−28.5°, +/−29°, +/−29.5°, +/−30°, +/−30.5°, +/−31°, +/−31.5°, +/−32°, +/−32.5°, +/−33°, +/−33.5°, +/−34°, +/−34.5°, +/−35°, +/−35.5°, +/−36°, +/−36.5°, +/−37°, +/−37.5°, +/−38°, +/−38.5°, +/−39°, +/−39.5°, +/−40°, +/−40.5°, +/−41°, +/−41.5°, +/−42°, +/−42.5°, +/−43°, +/−43.5°, +/−44°, +/−44.5°, or +/−45° or other incremental percentage between. The fiber angle range of +/−7 to 10° can be +/−7.0°, +/−7.1°, +/−7.2°, +/−7.3°, +/−7.4°, +/−7.5°, +/−7.6°, +/−7.7°, +/−7.8°, +/−7.9°, +/−8.0°, +/−8.1°, +/−8.2°, +/−8.3°, +/−8.4°, +/−8.5°, +/−8.6°, +/−8.7°, +/−8.8°, +/−8.9°, +/−9.0°, +/−9.1°, +/−9.2°, +/−9.3°, +/−9.4°, +/−9.5°, +/−9.6°, +/−9.7°, +/−9.8°, +/−9.9° or +/−10.0° or other incremental percentage between.

Non-limiting examples of composite materials for use with the drive shafts include, e.g., metals, carbon fiber, metal-carbon fiber, aramid fiber, fiber reinforcement unidirectional layers embedded in the thermoplastic polymer, or combinations thereof. For example, the composite drive shafts may be a composite tube that is a braided fiber and resin transfer molded component. Such components are typically more damage tolerant and have a higher ballistic survivability. The braided fiber may be either a two-dimensional or a three-dimensional braided fiber. However, it should be understood that the composite shaft may also be manufactured by filament winding, fiber placement, or any other processes that are deemed appropriate. The drive shafts can also include end adapters, which can be formed from a metallic material, such as aluminum, titanium, or steel, but may be formed from any other suitable rigid material, including non-metallic material. Composite materials and manufacturing of composite drive shafts are taught in, e.g., U.S. Pat. No. 7,335,108, relevant portions incorporated herein by reference.

The composite materials for use with the drive shafts may be made from a fiber mesh that is then contacted with a resin that is later cured into a solid, or the composite materials may be pre-impregnated (pre-preg) with the resin, that is, the fibers and the resin are together but the resin is not cured and these may be in the form of plies or laminates. Non-limiting example of resins used for the layers include, e.g., epoxy resin, cyanate resin, phenolic resin, polyimides, vinyl ester resin, unsaturated polyester resin, polyether ether ketone, or nylon. Generally, the resin is cured into a solid with or without heat and/or with or without vacuum. Typically, the various layers can be cured at the same time (co-cured), but it is also possible to form and cure sub-portions of the shaft in stages.

Now referring to FIGS. 1-3 and 6A, a helicopter 100 includes a fuselage 102, a main rotor gearbox 114 coupled to the fuselage 102, one or more engines 120a, 120b coupled to the main rotor gearbox 114, a rotor blade system 104 coupled to the main rotor gearbox 114, and a first drive shaft 202a having a proximal end 214 connected to the main rotor gearbox 114. The first drive shaft 202a includes one or more composite shafts 204a, 204b, 204c. Each composite shaft 204a, 204b, 204c includes: a first composite layer 605a having a fiber orientation that is a combination of fibers that are generally perpendicular to each other and a longitudinal axis of the shaft; a second composite layer 605b surrounding the first composite layer 605a and having generally parallel fibers, wherein the parallel fibers are disposed at an angle ranging between 25 to 45 degrees+/−3 degrees from the fibers in the first composite layer; a third composite layer 605c surrounding the second composite layer 605d, where the third composite layer 605c includes one or more transition layers having generally parallel fibers, wherein the parallel fibers are disposed at an angle ranging between 7 to 13 degrees+/−3 degrees from the fibers in the second composite layer 605b and each subsequent transition layer(s); a fourth composite layer 605d surrounding the third composite layer(s) 605c having generally parallel fibers, wherein the parallel fibers of each of the one or more transition layers are disposed at an angle ranging between 25 to 45 degrees+/−3 degrees from the fibers in the third composite layer(s) 605c; and a fifth composite layer 605e surrounding the fourth composite layer 605d and having a fiber orientation that is a combination of fibers that are generally perpendicular +/−3 degrees to each other and the fibers in the fourth composite layer 605d. In addition, an intermediate gearbox 206 is connected to a distal end 216 of the first drive shaft. A second drive shaft 202b having a proximal end 218 is connected to the intermediate gearbox 206, and includes one or more of the composite shafts 204d. A tail rotor gearbox 208 is connected to a distal end 220 of the second drive shaft 202b. A tail rotor 110 is coupled to the tail rotor gearbox 208. Note that the composite shaft 650 shown in FIG. 6B or other variant can be used instead of the composite shaft 600 shown in FIG. 6A.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A composite shaft consisting of:
    a first composite layer comprising a first fibrous material having a first fiber orientation comprising a combination of fibers that are generally perpendicular (+/−3 degrees) to each other and a longitudinal axis of the composite shaft;
    a second composite layer comprising a second fibrous material surrounding the first composite layer and having generally parallel fibers disposed at a first angle ranging between +/−25 to +/−45 degrees (+/−3 degrees) from the fibers in the first composite layer;
    three or more third composite layers surrounding the second composite layer, each third composite layer comprising a transition layer of the second fibrous material having generally parallel fibers disposed at a second angle ranging between +/−7 to +/−13 degrees (+/−3 degrees) from the fibers in the second composite layer and each subsequent transition layer;
    a fourth composite layer comprising the second fibrous material surrounding the third composite layer(s) having generally parallel fibers disposed at a third angle ranging between +/−25 to +/−45 degrees (+/−3 degrees) from the fibers in the third composite layer(s); and
    a fifth composite layer comprising the first fibrous material surrounding the fourth composite layer and having a second fiber orientation that is a combination of fibers that are generally perpendicular (+/−3 degrees) to each other and the longitudinal axis of the composite shaft.

2. The composite shaft of claim 1, wherein each of the first, second, third, fourth, and fifth composite layers comprise at least one of carbon, cellulose, aramid, nylon, polyethylene, or glass fibers.

3. The composite shaft of claim 1, wherein each of the first, second, third, fourth, and fifth composite layers comprise at least one of epoxy resin, cyanate resin, phenolic resin, polyimide resin, bismaleimide resin, vinyl ester resin, unsaturated polyester resin, polyether ether ketone, or nylon.

4. The composite shaft of claim 1, wherein each of the first, second, third, fourth, and fifth composite layers are one or more pre-preg sheets.

5. The composite shaft of claim 1, wherein the composite shaft is adapted for use in a rotorcraft.

6. The composite shaft of claim 1, wherein the composite shaft is formed into a tail rotor composite shaft, a drive shaft, a stiffener, a rod, a tube, or a transition shaft.

7. The composite shaft of claim 1, wherein the composite shaft is resistant to temperatures of approximately 400 degrees F.

8. The composite shaft of claim 1, wherein each of the three or more transition layers are disposed at an angle ranging between +/−10 degrees (+/−3 degrees).

9. The composite shaft of claim 1, wherein reinforcement fibers in the composite shaft comprise about 55 to 70 percent by volume.

10. A helicopter, comprising:
    a fuselage;
    a main rotor gearbox coupled to the fuselage;
    one or more engines coupled to the main rotor gearbox;
    a main rotor system coupled to the main rotor gearbox;
    a first drive shaft having a proximal end connected to the main rotor gearbox, the first drive shaft comprising one or more composite shafts, wherein each composite shaft consisting of:
        a first composite layer comprising a first fibrous material having a fiber orientation that is a combination of fibers that are generally perpendicular to each other and a longitudinal axis of the shaft,
        a second composite layer comprising a second fibrous material surrounding the first composite layer and having generally parallel fibers, wherein the parallel fibers are disposed at an angle ranging between 25 to 45 degrees (+/−3 degrees) from the fibers in the first composite layer,
        three or more third composite layers surrounding the second composite layer, each third composite layer comprising a transition layer of the second fibrous material having generally parallel fibers disposed at an angle ranging between 7 to 13 degrees (+/−3 degrees) from the fibers in the second composite layer and each subsequent transition layer,
        a fourth composite layer comprising the second fibrous material surrounding the third composite layer(s) having generally parallel fibers, wherein the parallel fibers of each of the one or more transition layers are disposed at an angle ranging between 25 to 45 degrees (+/−3 degrees) from the fibers in the third composite layer(s), and
        a fifth composite layer comprising the first fibrous material surrounding the fourth composite layer and having a fiber orientation that is a combination of fibers that are generally perpendicular (+/−3 degrees) to each other and the longitudinal axis of the composite shaft; and
    an intermediate gearbox connected to a distal end of the first drive shaft.

11. The helicopter of claim 10, further comprising:
    a second drive shaft having a proximal end connected to the intermediate gearbox, and comprising one or more of the composite shafts;
    a tail rotor gearbox connected to a distal end of the second drive shaft; and
    a tail rotor coupled to the tail rotor gearbox.

12. The helicopter of claim 10, wherein each of the first, second, third, fourth, and fifth composite layers comprise at least one of carbon, cellulose, aramid, nylon, polyethylene, or glass fibers.

13. The helicopter of claim 10, wherein each of the first, second, third, fourth, and fifth composite layers comprise at least one of epoxy resin, cyanate resin, phenolic resin, polyimide resin, bismaleimide resin, vinyl ester resin, unsaturated polyester resin, polyether ether ketone, or nylon.

14. The helicopter of claim 10, wherein each of the first, second, third, fourth, and fifth composite layers are one or more pre-preg sheets.

15. The helicopter of claim 10, further comprising:
    a first bearing assembly connected to a first end of each composite shaft; and a second bearing assembly connected to a second end of each composite shaft.

16. The helicopter of claim 10, wherein the composite shaft is resistant to temperatures of approximately 400 degrees F.

17. The helicopter of claim 10, wherein each of the three or more transition layers are disposed at an angle ranging between +/−10 degrees (+/−3 degrees).

18. The helicopter of claim 10, wherein reinforcement fibers in the composite shaft comprise about 55 to 70 percent by volume.

* * * * *